G. H. WHITELEY, Jr.
ARTIFICIAL TOOTH.
APPLICATION FILED APR. 18, 1916.

1,353,199.

Patented Sept. 21, 1920.

Witness
Daniel Webster Jr
E. W. Smith

Inventor
George H. Whiteley Jr.

Attorney

UNITED STATES PATENT OFFICE.

GEORGE H. WHITELEY, JR., OF YORK, PENNSYLVANIA, ASSIGNOR TO THE DENTISTS' SUPPLY COMPANY, A CORPORATION OF NEW YORK.

ARTIFICIAL TOOTH.

1,353,199.   Specification of Letters Patent.   Patented Sept. 21, 1920.

Application filed April 18, 1916. Serial No. 91,870.

*To all whom it may concern:*

Be it known that I, GEORGE H. WHITELEY, Jr., a citizen of the United States, and resident of York, county of York, and State of Pennsylvania, have invented an Improvement in Artificial Teeth, of which the following is a specification.

The object of my invention is to provide a construction for soldered pin teeth which will enable a strong anchorage for the pins with the employment of a relatively small amount of platinum of which the anchor is formed.

My invention consists in providing the vitreous tooth with an anchor of platinum or other suitable metal in disk form at the bottom of a hole, and in which the perimeter of the disk is slightly turned, the upper edge thereof meeting the outwardly curved portions of the hole adjacent to the bottom so as to provide a pronounced annular undercut portion having a metallic bottom, the pin being soldered to the extended surface of the disk and the solder extending up about the lower end of the pin and completely filling the space between said pin and walls of the hole adjacent to the anchor including the undercut portion, whereby a relatively large body of solder is provided about the lower end of the pin and extending into the annular undercut portion of the hole; all of which will be more fully understood by reference to the drawings, in which:—

Figure 1:
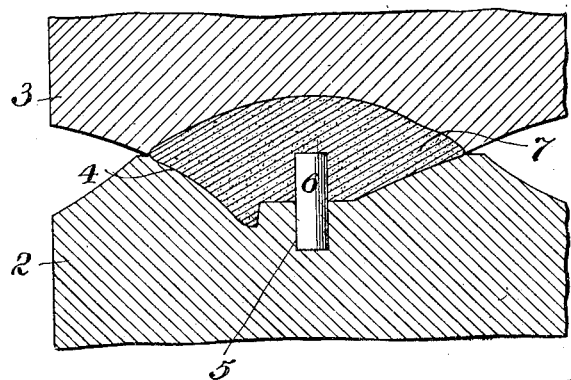
Figure 5:
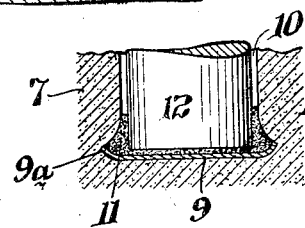
Figure 2:
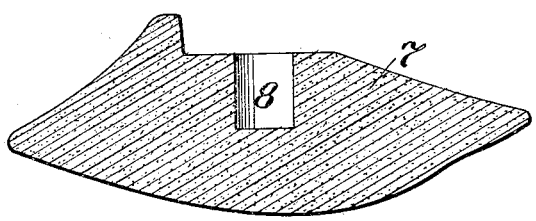
Figure 3:
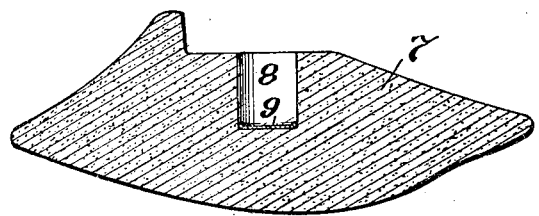
Figure 4:
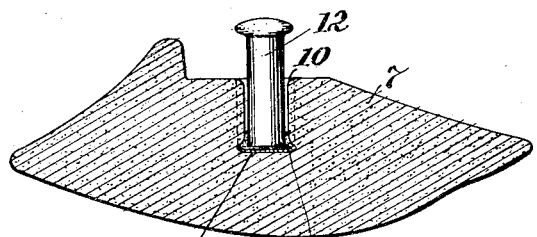

Figure 1 is a cross sectional view through a mold in which the bisque tooth is molded; Fig. 2 is a cross section of the bisque tooth removed from the mold (on a larger scale) and before being burned; Fig. 3 is the same bisque tooth shown in Fig. 2, with the anchor in position before being burned; Fig. 4 is a sectional view through a tooth with the pin complete; and Fig. 5 is an enlarged view of a portion of Fig. 4.

2 and 3 are the two parts of the mold, said parts having the depressions 4 therein which provide a space of the shape of the tooth to be made, and by means of which mold the bisque tooth 7 is molded. The depression in one part of the mold, namely that which corresponds to the back of the tooth, is provided with a hole 5 into which loosely fits a post or stud 6, a material portion of which projects into the space in which the bisque tooth 7 is molded, so that the bisque is molded about the stud to provide a suitable hole in the tooth to receive the anchor and pin. After the tooth has been molded as in Fig. 1 and dried out by a moderate heat, the mold is opened by removal of the upper part 3 and the bisque tooth, together with the stud 6, is shaken out of the lower part of the mold 2 after inverting it. The stud 6 is then withdrawn from the tooth and the dried bisque tooth 7 is then left with the hole 8 as indicated in Fig. 2. An anchor disk of thin sheet platinum or other suitable metal having great resistance against fusion by heat, is introduced into the hole 8 and pushed to the bottom thereof, as indicated at 9 in Fig. 3. It will be observed that this disk 9 has its circumferential edges slightly curved upward as more fully illustrated at $9^a$ in Fig. 5. When this disk is pushed down to the bottom of the hole 8, it is preferably of a diameter that just snugly fits the side walls of the hole, as indicated in Fig. 3. The tooth with the anchor disk in position is then fired or burned to vitrify the bisque material. During this burning, the diameter of the hole contracts, as indicated at 10 in Fig. 4, in which the vertical dotted lines indicate the diameter of the hole before burning. The final diameter of the hole is materially less than the diameter of the metallic disk or anchor 9, and in the contracting of the material to form the smaller hole 10, the bisque at the bottom of the hole rounds outward to the perimeter of the disk to provide an annular undercut portion indicated in Fig. 5. The slight upturned perimeter of the platinum disk 9 maintains the aperture at a maximum diameter at the very bottom of the hole, and the bisque walls curve as indicated. It will also be noted that during the baking, the bisque below the curved portions $9^a$ of the anchor close up against the bottom of this anchor, so that the anchor is solidly supported and locked in position within the tooth. The pin 12 is now soldered to the platinum anchor 9, and to accomplish this a small piece of solder is dropped into the hole upon the disk and the pin then placed in position resting upon the solder, and the hole subjected to sufficient heat to fuse the solder. The solder adheres to the bottom and lower side walls of the pin, and also flows out to the extreme perimeter of the disk 9, thoroughly adhering to the whole upper surface of the disk and providing a relatively large body of solder 11 filling the undercut portion of the hole and forming a strong union between the pin and the anchor. In this manner, the anchor and the solder together form a very strong inner head for the pin 12, and hold the same tightly in the tooth, the complete tooth being as indicated in Fig. 4. The pins 12 are made of various materials, sometimes gold, sometimes platinum, and often of a baser metal covered with gold, but I do not restrict myself to any particular material for the pin. The anchor 9 must be of a metal that will stand a high temperature, such as is necessary to convert the bisque into porcelain, whereas the pin 12 is only required to stand a temperature sufficiently to properly fuse the solder. Its composition, however, is preferably one which will resist acids of the mouth.

The platinum disk 9 may be of very thin gage, as it is reinforced first by the slightly curved perimeter, and secondly by the mass of solder which is made to thoroughly adhere to its upper surface; and by reason of the fact that the perimeter of the anchor 9 is curved upward as at 9ª, the base of the inward curvature of the hole portion 10 to provide the undercut is raised relatively higher from the general surface of the anchor than would be the case if the disk were flat; and consequently there is a larger annular space provided for the solder which greatly increases the strength of the anchoring feature of the pin. By employing a very thin sheet of platinum for the disk, economy is permitted, and because of the provisions herein stated for obtaining a larger annular undercut space for the solder, the importance of the upwardly curved perimeter is manifest.

While I have shown my improvement in the form considered most practical as a commercial embodiment of my invention, I do not restrict myself to the exact shape of the platinum disk, nor to the proportions illustrated, as these may be modified without departing from the spirit of the invention.

Having now described my invention, what I claim as new and desire to secure by Letters Patent, is:—

1. An artificial tooth having a porcelain body provided with a hole and an anchor of flat sheet metal in the bottom of the hole, said anchor having slightly upturned edges and the side walls of the hole curved outward at the bottom and terminating in the perimeter and upturned edges of the anchor and providing an annular undercut recess in the porcelain, the anchor secured in position by the contracting of the porcelain during the burning operation.

2. An artificial tooth having a porcelain body provided with a hole and an anchor of flat sheet metal in the bottom of the hole, said anchor having slightly upturned edges terminating at its largest diameter and the side walls of the hole curved outward at the bottom and terminating in the perimeter and upturned edges of the anchor and providing an annular undercut recess in the porcelain, the anchor secured in position by the contracting of the porcelain during the burning operation, combined with a pin extending into the hole and reaching close to the flat anchor, and a connecting means between the anchor and pin consisting of solder covering the surface of the anchor and the bottom and lower part of the pin and also filling the annular undercut recess to provide a second anchorage for the pin and a stiffening for the flat sheet metal anchor.

3. An anchor for a porcelain tooth, consisting of a disk of very thin sheet metal, having a flat shaped central part provided with an upwardly turned perimeter the free edge of which is very slightly above the plane of the flat shaped central portion and constitutes the outer boundary of greatest diameter, the construction being such that the entire disk surfaces are unobstructed from each side thereof.

4. The method herein described for forming an anchoring head within a porcelain tooth for securing thereto the attaching pin, which consists in molding a tooth from bisque material and providing a hole in the molded tooth with smallest cross section at the bottom, next inserting a metal disk having upturned edges into the hole and pushing the same to the bottom thereof so that said disk contacts with the middle part of the bottom of the hole and also with the side walls thereof slighty above the bottom and central upper surface of the disk to provide the hole with a slightly upcurved metal surface, burning the bisque tooth to transform the bisque material into porcelain and causing thereby a shrinkage of its material to reduce the diameter of the hole, said shrinkage beginning at a distance above the bottom of the hole and central surface of the disk and gradually increasing from the perimeter of the upwardly curved edge of the metal disk to the main portion of the hole and thereby providing an annular recess at the bottom of the hole partly formed in the upturned metal disk and partly in the inwardly exposed contracted porcelain of the hole adjacent to and above the metal disk, the disk offering resistance to prevent shrinkage of the porcelain adjacent to its perimeter down to the flat surface level of the disk, inserting a pin into said contracted hole, and uniting the inner end of the pin to the metal disk by soldering and causing the solder to fill the annular undercut recess to provide a thick body of solder adjacent to the perimeter of the disk and form with the disk a conical head to the inner end of the pin to lock it in position within the porcelain tooth.

In testimony of which invention, I hereunto set my hand.

GEORGE H. WHITELEY, JR.

Witnesses:
CHARLES L. RODGERS,
HARRY S. EBERT.